Patented Dec. 5, 1944

2,364,460

UNITED STATES PATENT OFFICE 2,364,460

COATING SYSTEM FOR PROTECTING SURFACES AGAINST MARINE GROWTH

George B. McLean, San Pedro, Calif., assignor to Union Oil Company of California, Los Angeles, Calif., a corporation of California No Drawing. Application September 24, 1940, Serial No. 358,146

6 Claims. (Cl. 117—92)

This invention relates to a method for preventing attachment and growth of marine life, such as barnacles, mussels, algae, etc., on surfaces submerged in sea water.

It is well known that objects such as the hulls or ships' bottoms of barges, ships, etc., submerged in water, particularly in sea water, are rapidly attached by the marine life such as barnacles, mussels, algae and the like. Such growth on the hulls of ships is of vital importance since it obviously affects the operating efficiency and speed of the ship. For this purpose, it has been proposed to paint hulls or ships' bottoms with antifouling paints which usually contain a slightly soluble toxic material such as copper oxide, sodium cyanide and the like for the purpose of killing the marine life that may adhere to the surface. Usually the protecting system for the submerged surface consisted in successive coatings of primer paint, usually red lead, anti-corrosive paint and antifouling paint.

When the submerged surface is attacked by marine life, the coatings of anti-corrosive and primer paints are injured sufficiently so that they no longer perform their functions. Consequently, it is necessary to scrape the whole paint system along with the marine life which makes it necessary to replace the aforementioned paint system before the ship can be again submerged in water.

Since the property of the antifouling paint to kill marine life depends upon leaching of the toxicant by the water surrounding the object thus coated, it is apparent that the life of the paint is necessarily very short. Testing of a relatively large number of various commercial antifouling compounds has shown that all of these products must be replaced within less than a year.

I have discovered that when the ships' bottoms or hull are first given an application of asphaltic material prior to the application of the antifouling paint, that the effective life of the latter is materially increased. In fact, in one case a hull protected with an application of the asphaltic coating followed by a coating of antifouling paint was sufficiently protected so that an examination of the hull at the end of a six months period showed less marine growth and deterioration of the coating than previously observed in the same period of time when the same antifouling paint was applied over the conventional coatings of primer and anti-corrosive paints. Also the application of the asphaltic material to the hull without subsequent application of the antifouling paint did not resist marine growth. However, the combination of asphalt coating and antifouling paint gave outstandingly greater protection than was obtained with either material alone.

It is not known for certain why the aforementioned asphalt-paint combination is so peculiarly effective since the antifouling paint is merely applied over the asphalt coating, but probably some of the advantages of the asphalt consist of providing a matrix to which the antifouling paint adheres tenaciously, resulting in less loss of active toxic material by the leaching action of the sea water. Another explanation may be that the asphalt dries or hardens almost immediately upon application to the hull and in consequence neither the anti-fouling paint nor the other types of paint which are sometimes used between the antifouling and the primer and anti-corrosive paints, are mutually dissolved into one another or otherwise deteriorated.

It is thus an object of my invention to provide a coating system for surfaces submerged in sea water containing marine life.

Another object of the invention is to provide a coating system for surfaces submerged in sea water which is sufficiently effective to prevent marine growth on the surface and to prevent corrosion of the surface in the case where the surface to be protected consists of a corrodible metal.

Other objects, features and advantages of my invention will be apparent to those skilled in the art from the following description of my invention.

The type of asphalt which may be employed varies over a fairly wide range, it being essential that the asphalt have sufficient hardness that it will not dent on contact with objects or slough off the surface and have sufficient softness to adhere properly to the surface. An asphalt suitable for the purpose may have a melting point of 90–300° F. and a penetration at 77° F. of 2–200. I have found asphalts having a penetration of approximately 30–40 at 77° F. and a melting point of 190–200° F. to be particularly suitable for the purpose. Also, asphalts in which is incorporated an inert mineral filler such as diatomaceous earth in the proportion of 85% asphalt and 15% of the filler provide an asphalt enamel which resists impact to floating debris. This asphalt enamel has a melting point of 235–250° F. and a penetration of 2–4 at 77° F. If desired, laminated coatings of the aforementioned relatively soft and relatively hard asphalts may be employed with the softer of the two asphalts providing a good bond between the surface to be protected and the harder asphalt.

Generally, it is unnecessary to provide a coat of primer paint such as red lead on the surface before applying the asphalt coating since the latter furnishes an adequate bond to the surface, particularly where the surface has been thoroughly freed from dirt, rust, oil and the like as by sand blasting. However, it is within the scope of my invention to provide a red lead asphalt base or other suitable primer in such cases where this is essential to obtain a good bond to the structure.

Preferably the asphalt coating is applied hot and in the melted and free flowing state by spraying or mopping the asphalt on the surface. However, the asphalt may be applied in the cold as a cut-back asphalt paint containing a volatile thinning solvent such as benzol or petroleum spirits. However, cut-back asphalts are not preferred since they require a relatively long time to dry and set up when applied in suitable thickness. A thin coating, for example, approximately $\frac{1}{16}$ to $\frac{1}{8}$ inch in thickness is sufficient to afford the proper protection to the surface and thicknesses greater than the above are not only unnecessary but undesirable from the dead weight standpoint and from the difficulty of obtaining a smooth surface.

After the asphalt coating has set to normal hardness, the coating of antifouling paint may be applied to the desired thickness as by means of a brush or spray and as is customary, the structure is placed in the sea water prior to the complete drying of the antifouling paint.

As disclosed above, it is preferable and the subject matter of my invention to place successive coatings of the asphalt and antifouling paint rather than to apply a mixture of asphalt and antifouling paint as a single-coat system. In one case, such a mixture was applied to a metal surface and immersed in sea water. It was found that after several months of immersion, the coating blistered and deteriorated and no longer protected the metal surface against corrosion. Also, the asphalt entrapped the toxic agent and did not permit it to poison marine growth.

It is to be understood that the above is merely illustrative of preferred embodiments of my invention of which many variations may be made by those skilled in the art without departing from the spirit thereof.

I claim:

1. A method for protecting underwater metal surfaces against marine growth which comprises first coating said surface with asphaltic material, allowing said asphaltic material to harden to its normal hardness, and subsequently applying a coating of antifouling paint over said coating of asphaltic material in which the asphaltic material is an asphalt having a melting point of 90 to 300° F. and a penetration of 2 to 200 at 77° F.

2. A method for protecting underwater metal surfaces against marine growth which comprises first coating said surface with asphaltic material, allowing said asphaltic material to harden to its normal hardness, and subsequently applying a coating of antifouling paint over said coating of asphaltic material in which the asphaltic material is an asphalt having a melting point of 190-200° F. and a penetration of 30-40 at 77° F.

3. A method for protecting underwater metal surfaces against marine growth which comprises first coating said surface with asphaltic material, allowing said asphaltic material to harden to its normal hardness, and subsequently applying a coating of antifouling paint over said coating of asphaltic material in which the asphaltic material is an asphalt having a melting point of 235-250° F. and a penetration of 2-4 at 77° F.

4. A metal article protected against marine growth by a coating of asphalt having a melting point of 90 to 300° F. and a penetration of 2 to 200 at 77° F. and a topcoat of an antifouling paint.

5. A metal article protected against marine growth by a coating of asphalt having a melting point of 190-200° F. and a penetration of 30-40 at 77° F. and a topcoat of an antifouling paint.

6. A metal article protected against marine growth by a coating of asphalt having a melting point of 235-250° F. and a penetration of 2-4 at 77° F. and a topcoat of an antifouling paint.

GEORGE B. McLEAN.